(12) United States Patent
Wu et al.

(10) Patent No.: US 8,918,054 B2
(45) Date of Patent: Dec. 23, 2014

(54) INTERFERENCE ELIMINATION METHOD, INTERFERENCE ELIMINATION DEVICE, AND COMMUNICATION SYSTEM

(71) Applicant: Huawei Technologies Co., Ltd., Shenzhen, Guangdong (CN)

(72) Inventors: Gengshi Wu, Shanghai (CN); Wenkang Guan, Shanghai (CN); Chunling Zhang, Shanghai (CN); Zhiqun Chen, Shanghai (CN); Nian Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 13/730,700

(22) Filed: Dec. 28, 2012

(65) Prior Publication Data

US 2013/0189927 A1 Jul. 25, 2013

(30) Foreign Application Priority Data

Dec. 31, 2011 (CN) .......................... 2011 1 0459165

(51) Int. Cl.
*H04B 1/12* (2006.01)
*H04B 1/7107* (2011.01)
*H04B 15/00* (2006.01)
*H04J 11/00* (2006.01)

(52) U.S. Cl.
CPC .............. *H04B 15/00* (2013.01); *H04J 11/005* (2013.01)
USPC ....................................................... 455/63.1

(58) Field of Classification Search
USPC ................... 455/63.1, 67.13, 226.1, 296, 307
See application file for complete search history.

(56) References Cited

U.S. PATENT DOCUMENTS

| 6,574,270 | B1 | 6/2003 | Madkour et al. |
| 7,400,608 | B2 * | 7/2008 | Papasakellariou et al. ... 370/335 |
| 8,331,477 | B2 * | 12/2012 | Huang et al. ................. 375/267 |
| 2010/0203840 | A1 * | 8/2010 | Mouhouche ............... 455/67.13 |
| 2010/0329398 | A1 * | 12/2010 | Rao et al. ...................... 375/346 |
| 2013/0287087 | A1 | 10/2013 | Tang et al. |

FOREIGN PATENT DOCUMENTS

| CN | 101004681 A | 7/2007 |
| CN | 101060510 A | 10/2007 |
| CN | 101482834 A | 7/2009 |
| CN | 101931446 A | 12/2010 |
| CN | 102025392 A | 4/2011 |

OTHER PUBLICATIONS

Written Opinion of the International Searching Authority dated Jan. 27, 2011 in connection with International Patent Application No. PCT/CN2010/078271.

* cited by examiner

*Primary Examiner* — Blane J Jackson

(57) ABSTRACT

Embodiments of the present invention provide an interference elimination method, an interference elimination device and a communication system, which are used to implement the effective elimination of signal interference of a receiving end. The method includes: according to a received signal, reconstructing a main cell signal, obtaining the reconstructed main cell signal, and subtracting the reconstructed main cell signal from the received signal, so as to obtain a first residual signal; according to the first residual signal, reconstructing an interference cell signal, and obtaining the reconstructed interference cell signal; and according to the received signal and the reconstructed interference cell signal, obtaining an interference-eliminated main cell signal. According to the interference elimination method, the interference elimination device and the communication system in the embodiments of the present invention, the interference elimination may be performed on the received signal effectively.

21 Claims, 9 Drawing Sheets

INTERFERENCE ELIMINATION METHOD, INTERFERENCE ELIMINATION DEVICE, AND COMMUNICATION SYSTEM

CROSS-REFERENCE TO RELATED APPLICATIONS

This application claims priority to Chinese Patent Application No. 201110459165.1, filed on Dec. 31, 2011, which is hereby incorporated by reference in its entirety.

FIELD OF THE INVENTION

The present invention relates to the field of communications technologies, and in particular, to an interference elimination method, an interference elimination device, and a communication system.

BACKGROUND OF THE INVENTION

In a downlink wideband code division multiple access system (Wideband Code Division Multiple Access, WCDMA), transmission signals of different cells are distinguished by using a scrambling code of a non-orthogonal pseudo random sequence, so when an adjacent cell and a current cell transmit signals together in the same time and frequency band, signals transmitted from different base stations will interfere with each other, that is, form inter-cell interference. The inter-cell interference has significant impact on the system performance, and particularly the impact on the performance of a cell edge zone is more serious.

In the prior art, the following two manners are often adopted to eliminate the inter-cell interference: one is a linear interference elimination method, though the linear interference elimination method can inhibit an interference cell signal to a certain extent, the inhibiting effect is bad and the residual interference is still strong; the other is a non-linear interference elimination method, that is, the reconstruction is performed on the interference cell signal by using a matching filter or a linear minimum mean square error (Linear Minimum Mean Square Error, LMMSE) receiver, and then the reconstructed interference cell signal is subtracted from a received signal, so as to obtain a real signal. However, there often exists a large error between the interference cell signal obtained through reconstruction and a real interference cell signal. When the distortion of reconstructed signal is so strong that an excessively large estimated error is caused, the elimination gain will be decreased by eliminating the inter-cell interference in the manner, or even a negative gain will occur.

SUMMARY OF THE INVENTION

Embodiments of the present invention provide an interference elimination method, an interference elimination device and a communication system, which are used to implement the effective elimination of signal interference of a receiving end.

According to one aspect of the embodiments of the present invention, an interference elimination method is provided, which includes:

according to a received signal, reconstructing a main cell signal, obtaining the reconstructed main cell signal, and subtracting the reconstructed main cell signal from the received signal, so as to obtain a first residual signal;

according to the first residual signal, reconstructing an interference cell signal and obtaining the reconstructed interference cell signal; and according to the received signal and the reconstructed interference cell signal, obtaining an interference-eliminated main cell signal.

According to another aspect of the embodiments of the present invention, an interference elimination device is further provided, which includes:

a main cell signal reconstruction unit, configured to, according to a received signal, reconstruct a main cell signal, obtain the reconstructed main cell signal, and subtract the reconstructed main cell signal from the received signal, so as to obtain a first residual signal;

an interference cell signal reconstruction unit, configured to, according to the first residual signal, reconstruct an interference cell signal, and obtain the reconstructed interference cell signal; and a main cell signal obtaining unit, configured to, according to the received signal and the reconstructed interference cell signal, obtain the interference-eliminated main cell signal.

According to still another aspect of the embodiments of the present invention, a communication system is further provided, and includes: an interference elimination device, a transmitter and a receiver, in which the transmitter and the receiver are located in a same cell, the cell where the transmitter and the receiver are located is a main cell, an adjacent cell that causes interference to the main cell is an interference cell;

the interference elimination device is configured to, according to a received signal, reconstruct a main cell signal, obtain the reconstructed main cell signal, and subtract the reconstructed main cell signal from the received signal to obtain a first residual signal; according to the first residual signal, reconstruct an interference cell signal and obtain the reconstructed interference cell signal; and according to the received signal and the reconstructed interference cell signal, obtain an interference-eliminated main cell signal;

the transmitter is configured to transmit a signal to the receiver; and the receiver is configured to receive the signal transmitted by the transmitter.

According to the interference elimination method, the interference elimination device and the communication system provided by the embodiments of the present invention, because the main cell signal is generally the strongest signal in the received signal, and because the receiver is located in the main cell, and can know more configuration and transmission information of the main cell relative to the interference cell, the reconstruction may be performed well on the main cell signal. Therefore, when the interference cell signal reconstruction is performed based on the first residual signal that is obtained after the reconstructed main cell signal is subtracted from the received signal, the accuracy of the reconstructed interference cell signal is greatly improved relative to the reconstruction performed on the interference cell signal directly according to the received signal, the inter-cell interference is eliminated effectively, and thereby the precision of the finally obtained main cell signal is improved.

BRIEF DESCRIPTION OF THE DRAWINGS

To illustrate the technical solutions in the embodiments of the present invention more clearly, the following briefly describes the accompanying drawings for describing the embodiments of the present invention. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages the present invention more comprehensible, the following clearly and completely describes the technical solutions according to the embodiments of the present invention with reference to the accompanying drawings in the embodiments of the present invention. Apparently, the embodiments in the following description are merely a part of rather than all the embodiments of the present invention. All other embodiments obtained by persons of ordinary skill in the art based on the embodiments of the present invention without creative efforts shall fall within the protection scope of the present invention.

The interference elimination method in the embodiments of the present invention is used to perform interference elimination on a signal received by a receiver under a multi-cell environment, so as to obtain an interference-free original transmission signal from the received signal. Therefore, the interference elimination method in the embodiments of the present invention is, for example, executed by an interference elimination device, and the interference elimination device may be integrated in the receiver, or connected with the receiver to perform the interference elimination processing on the signal received by the receiver. The communication between a transmitter and a receiver in a cell of multiple cells is taken as an example to be illustrated as follows: a cell where the transmitter and the receiver are located is referred to as a main cell, an adjacent cell that causes interference to the main cell is referred to as an interference cell, and the interference elimination method in the embodiments of the present invention is illustrated from the aspect of the receiver in the main cell.

Embodiment 1

Figure 1:
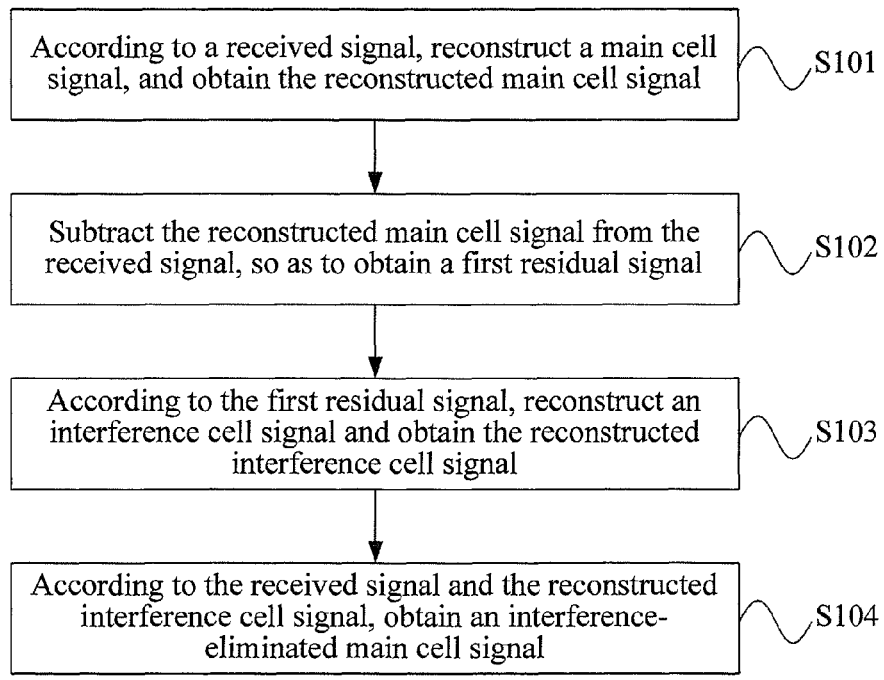
FIG. 1 is a flow chart of an interference elimination method according to Embodiment 1 of the present invention.

FIG. 1 is a flow chart of an interference elimination method in Embodiment 1 of the present invention. As shown in FIG. 1, the method includes the following steps:

Step S101: According to a received signal, reconstruct a main cell signal, and obtain the reconstructed main cell signal.

Step S102: Subtract the reconstructed main cell signal from the received signal, so as to obtain a first residual signal.

Step S103: According to the first residual signal, reconstruct an interference cell signal and obtain the reconstructed interference cell signal.

Step S104: According to the received signal and the reconstructed interference cell signal, obtain an interference-eliminated main cell signal.

Figure 2:
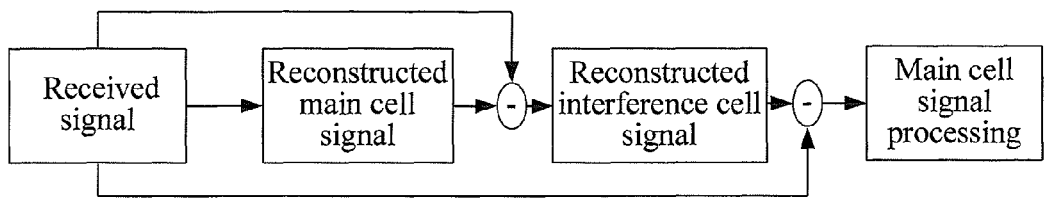
FIG. 2 is a schematic flow chart of the signal processing of an interference elimination method according to Embodiment 1 of the present invention.

Specifically, FIG. 2 is a schematic flow chart of the signal processing of an interference elimination method in Embodiment 1 of the present invention. As shown in FIG. 2, a receiver obtains the reconstructed main cell signal according to the received signal, subtracts the reconstructed main cell signal from the received signal, and according to the first residual signal obtained by performing the subtracting, obtains the reconstructed interference cell signal.

Figure 3:
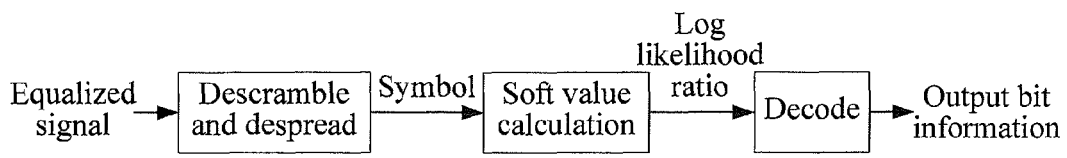
FIG. 3 is a schematic diagram of the main cell signal processing of an interference elimination method according to Embodiment 1 of the present invention.

After the reconstructed interference cell signal is obtained, the main cell signal is processed according to a difference value obtained by subtracting the reconstructed interference cell signal from the received signal, and the interference-eliminated main cell signal may be obtained. FIG. 3 is a schematic diagram of the processing on the main cell signal of an interference elimination method in Embodiment 1 of the present invention. As shown in FIG. 3, for example, an equalized signal is obtained by subtracting the reconstructed interference cell signal from the received signal, and the processing, such as descrambling and despreading, soft value calculation and decoding is performed on the equalized signal, so as to obtain final output bit information, that is, the main cell signal restored from the received signal.

According to the interference elimination method of Embodiment 1 of the present invention, because the main cell signal is generally the strongest signal in the received signal, and because the receiver is located in the main cell, and can know more configuration and transmission information of the main cell relative to the interference cell, the reconstruction may be performed well on the main cell signal. Therefore, when the interference cell signal reconstruction is performed based on the first residual signal that is obtained after the reconstructed main cell signal is subtracted from the received signal, the accuracy of the reconstructed interference cell signal is greatly improved relative to the reconstruction performed on the interference cell signal directly according to the received signal, the inter-cell interference is eliminated effectively, and thereby the precision of the finally obtained main cell signal is improved.

Furthermore, in the interference elimination method in the foregoing Embodiment 1, the performing the reconstructing the main cell signal or performing the reconstructing each interference cell signal specifically includes:

according to the following formula (1), performing the preprocessing on a to-be-reconstructed target cell signal, in which w is an equalization coefficient of the target cell signal, $\sigma_{x\,target}^2$ is the power of the target cell signal, $\sigma_x^2$ is the power of the main cell signal, $\sigma_{x\,i}^2$ is the power of the $i^{th}$ interference cell signal, $h_{target}$ is an estimated value of a target cell channel, h is an estimated value of a main cell channel, $h_i$ is an estimated value of the $i^{th}$ interference cell channel, N is the number of interference cells, H is a conjugated transpose, I is a unit matrix, and $\sigma_n^2$ is the noise power;

$$w = \sigma_{x\,target}^2 h_{target}^H \left( \sigma_x^2 h h^H + \sum_{1}^{N} \sigma_{xi}^2 h_i h_i^H + \sigma_n^2 I \right)^{-1} \quad \text{Formula (1)}$$

detecting a code channel occupied by the target cell signal in the target cell;

performing code channel signal reconstruction processing on each code channel, and obtaining a code channel reconstruction sub-signal corresponding to each code channel;

multiplying each code channel reconstruction sub-signal by a specified elimination coefficient, and convolving the accumulation sum of each code channel reconstruction sub-signal multiplied by the elimination coefficient with the estimated value $h_{target}$ of the target cell channel, in which:

the target cell is the main cell or the interference cell which is to be reconstructed.

Specifically, when the reconstruction is performed on the main cell signal, the main cell is the target cell, and the reconstruction process includes the following two phases:

In the first phase, the power of the main cell signal, the power of N interference cell signals, the noise power, the estimated value of the main cell channel and an estimated value of the N interference cell channels are calculated, and the equalization coefficient of the main cell signal is calculated according to the formula (1), and the equalization coefficient of the main cell signal obtained by calculating is convolved with an input signal of the main cell signal reconstruction, that is, the received signal, so as to perform the linear equalization on the target cell signal.

Because the interference cell signal is modeled in the equalization coefficient calculation formula (1) in the form of colored interference, the performing of the linear equalization on the main cell, and the performing of the linear inhibition on the interference cell at the same time, may separate the main cell signal from the received signal well. For the separated main cell signal, if the separated main cell signal is the current user signal of the main cell, a user equipment, that is, a receiver, knows which orthogonal variable spreading factor (OVSF) code channels through which the signal is transmitted. For other user signals of the main cell, which OVSF code channels through which the signal is transmitted is required to be known through OVSF code channel detection.

In the second phase, the reconstruction is performed on the separated main cell signal according to each of all detected OVSF code channels that transmit the signal, and the reconstruction may be blind reconstruction and/or soft reconstruction. Preferably, the manner of combining the blind reconstruction and the soft reconstruction is adopted to implement the reconstruction on the main cell signal, so as to improve the accuracy of the signal reconstruction, that is:

if modulation manner information of the OVSF code channel is known, performing the soft reconstruction on the OVSF code channel according to the modulation manner information; and if the modulation manner information of the OVSF code channel is unknown and undetected, performing the blind reconstruction on the OVSF code channel.

The blind reconstruction refers to performing the descrambling and the despreading and then the scrambling and the spreading on signals of each detected OVSF code channel, and adding the scrambled and spread signals of each code channel, so as to obtain the reconstructed main cell signal. The soft reconstruction refers to that, when a modulation manner of signals of each code channel may be known or detected, such as quadrature phase-shift keying (QPSK) modulation, 16 quadrature amplitude modulation (QAM) or 64 QAM, the main cell signal is reconstructed by calculating the soft value of a symbol or a bit. Besides, if other decoding-related information of the OVSF code channel is known, the precision of the reconstructed main cell signal may be improved in the manner of first decoding and then recoding.

After the reconstructed signal for each OVSF code channel is obtained in the foregoing reconstruction manners, the reconstructed signal of each OVSF code channel is multiplied by a specified elimination coefficient, the reconstructed signals of OVSF code channels multiplied by the elimination coefficient are accumulated, and an accumulation value obtained by performing such accumulation is convolved with the estimated value $h_{target}$ of the main cell channel, and the reconstructed main cell signal is obtained. The elimination coefficient may be set by taking a cell as a unit, that is, an elimination coefficient is set for the main cell and each interference cell. Preferably, the elimination coefficient is set by taking the OVSF code channel as a unit. For example, an elimination coefficient is set for the foregoing each detected OVSF code channel involved in the signal transmission in the main cell.

The elimination coefficient, for example, is set according to a signal-to-noise ratio of a cell or a code channel, the larger the signal-to-noise ratio is, the larger the elimination coefficient is, and the elimination coefficient may also be obtained in other manners. Preferably, the numerical range of the elimination coefficient is set to be greater than 0 and less than 2. By multiplying each reconstructed signal by an elimination coefficient, the gain of the non-linear interference elimination is optimized through a dynamic adjustment on the elimination coefficient.

In the interference elimination method in the foregoing Embodiment 1, after the reconstructed main cell signal is subtracted from the received signal, the interference cell signal is reconstructed. The residual power of the current main cell signal, the power of N interference cell signals, the noise power, the estimated value of the main cell channel and an estimated value of the N interference cell channels are recalculated, and the equalization coefficient of the interference cell signal are calculated according to the formula (1). At this time, the power $\sigma_{x\,target}^2$ of the target cell signal in the formula (1) is the power of the interference cell signal, and the estimated value $h_{target}$ of the target cell channel is the estimated value of the interference cell channel. The subsequent steps are the same as the process of reconstructing the main cell signal, which are not repeated again herein.

Embodiment 2

In the interference elimination method in Embodiment 2 of the present invention, based on the interference elimination method in the foregoing Embodiment 1, the performing the reconstructing the interference cell signal according to the first residual signal includes:

according to the first residual signal, reconstructing a first interference cell with the highest power in the interference cell, obtaining the reconstructed first interference cell signal, and subtracting the reconstructed first interference cell signal from the received signal, so as to obtain a second residual signal, and according to the second residual signal, performing the serial or parallel reconstruction processing on interference signals of one or more other interference cells except the first interference cell.

Figure 4:
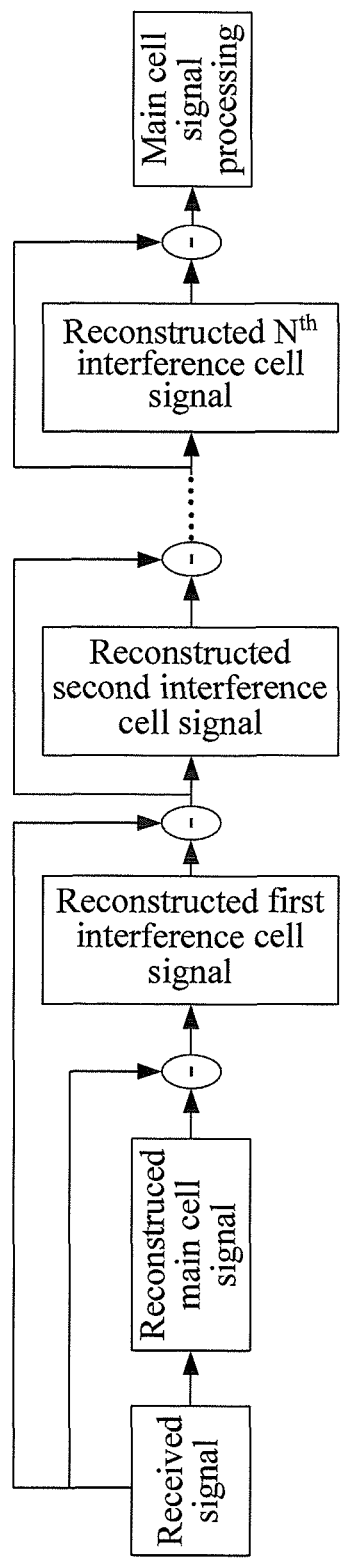
FIG. 4 is a schematic flow chart of the signal processing of an interference elimination method according to Embodiment 2 of the present invention.

FIG. 4 is a schematic flow chart of the signal processing of an interference elimination method in Embodiment 2 of the present invention. As shown in FIG. 4, according to the difference between the received signal and the reconstructed main cell signal, first a first interference cell signal is reconstructed, and the serial reconstruction processing is executed on residual N−1 interference cell signals based on the difference between the received signal and the reconstructed first interference cell signal, and the reconstructed N−1 interference cell signals are subtracted accordingly from the received signal, so as to obtain an interference-eliminated main cell signal and perform the equalization, and for example, the processing manner of the main cell signal shown in FIG. 3 is adopted to execute the processing on the main cell signal. The first interference cell may be any one of the N interference cells or an interference cell selected in a certain manner, and the method of obtaining any reconstructed interference cell signal is the same as that in Embodiment 1, which is not repeated again herein.

In a signal processing flow shown in FIG. 4, only the first interference cell signal is reconstructed according to the difference value between the received signal and the reconstructed main cell signal, the remaining interference cell signals all are reconstructed according to the difference value between the received signal and the previously obtained interference cell signal that is reconstructed, and therefore, preferably, the signal reconstruction processing is first performed on the interference cell with higher power.

For example, the power of each interference cell is estimated, and according to the sequence of the estimated values of the power of interference cells, an interference cell sequence is generated in descending order, in which, the power of the first interference cell is the highest, the power of the second interference cell is the second highest, the power of the remaining interference cells is decreased progressively in this manner, and the power of the $N^{th}$ interference cell is the lowest.

According to the interference elimination method in the foregoing Embodiment 2, when there exists multiple interference cells, because the reconstructed signal of the first interference cell with the strongest power is obtained according to the difference between the received signal and the reconstructed main cell signal, the signal reconstruction is performed on the interference cell with the strongest power with high precision, thereby improving the precision of executing reconstruction of the remaining interference cell signals sequentially based on the difference between the received signal and the reconstructed first interference cell signal, and improving the accuracy of the interference elimination.

Besides, apart from the two signal processing processes shown in the foregoing FIG. 4, other signal processing processes may further be adopted to reconstruct multiple interference cells. For example, based on the first residual signal, the first interference cell is reconstructed and the reconstructed first interference cell signal is obtained, and based on the difference between the received signal and the reconstructed first interference cell signal, the parallel signal reconstruction is executed on the second interference cell to the $N^{th}$ interference cell.

Embodiment 3

In the interference elimination method in Embodiment 3 of the present invention, based on the interference elimination method in Embodiment 1, the performing the reconstructing the interference cell signal according to the first residual signal includes: according to the first residual signal, performing the parallel reconstruction processing on a signal of each interference cell, so as to obtain each reconstructed interference cell signal.

Figure 5:
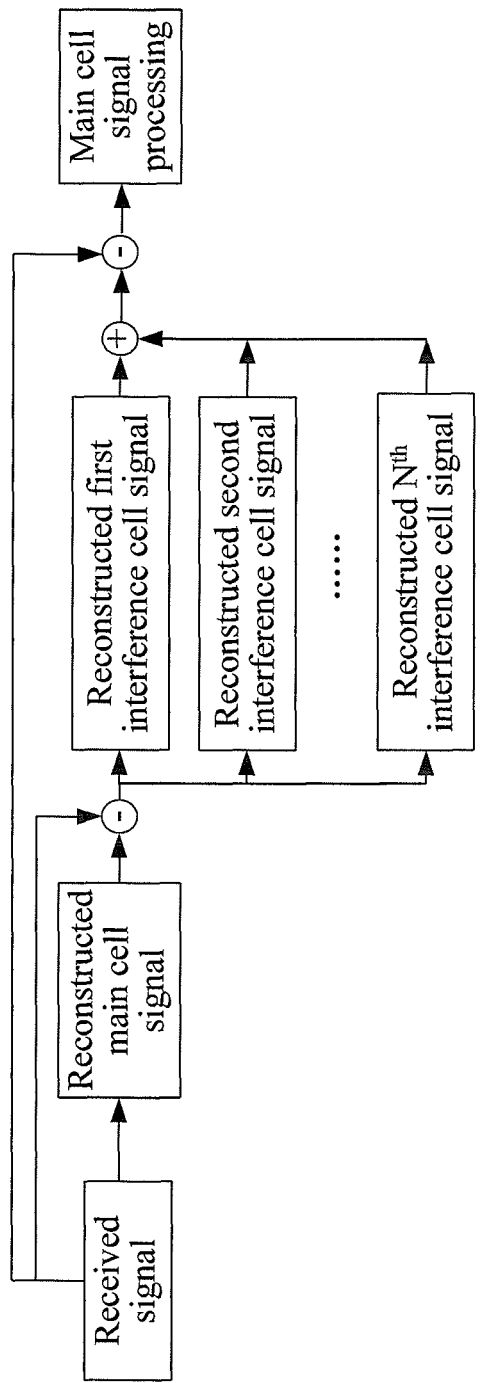
FIG. 5 is a schematic flow chart of the signal processing of an interference elimination method according to Embodiment 3 of the present invention.

FIG. 5 is a schematic flow chart of the signal processing of an interference elimination method in Embodiment 3 of the present invention. As shown in FIG. 5, in the interference elimination method in Embodiment 3, after the reconstructed main cell signal is obtained, and the first residual signal is obtained by subtracting the reconstructed main cell signal from the received signal, the parallel signal reconstruction is executed on the N interference cells directly based on the first residual signal. That is, according to the first residual signal, the reconstructed first interference cell signal is obtained, and according to the first residual signal, the reconstructed second interference cell signal is obtained. Similarly, the reconstructed $N^{th}$ interference cell signal is obtained. The method of obtaining any one of the reconstructed interference cell signals is the same as that in Embodiment 1, which is not repeated again herein. After all the reconstructed N interference cell signals are obtained, the reconstructed N interference cell signals are accumulated, the accumulation value of the reconstructed interference cell signals is obtained, and the accumulation value of the reconstructed interference cell signals is subtracted from the received signal, so as to obtain an interference-eliminated main cell signal and perform the equalization, and for example, the processing manner of the main cell signal shown in FIG. 3 is adopted to execute the processing on the main cell signal.

According to the interference elimination method in the foregoing Embodiment 3, when there exists multiple interference cells, after the reconstructed main cell signal is eliminated from the received signal, the parallel signal reconstruction is executed on the multiple interference cells based on the first residual signal, so that each interference cell signal is reconstructed under the condition of excluding the reconstructed main cell signal with the maximum power, and the precision of the each obtained interference cell signal that is reconstructed is improved.

Embodiment 4

In the interference elimination method in Embodiment 4 of the present invention, based on any one of the interference elimination methods in the foregoing Embodiments 1 to 3, the obtaining the interference-eliminated main cell signal according to the received signal and the reconstructed interference cell signal specifically includes:

calculating a mean value of the reconstructed main cell signal;

subtracting the reconstructed main cell signal and the reconstructed interference cell signal from the received signal, and obtaining a residual signal; and according to the residual signal, performing the equalization and adding the equalized residual signal with the mean value, and obtaining the interference-eliminated main cell signal.

Figure 6:
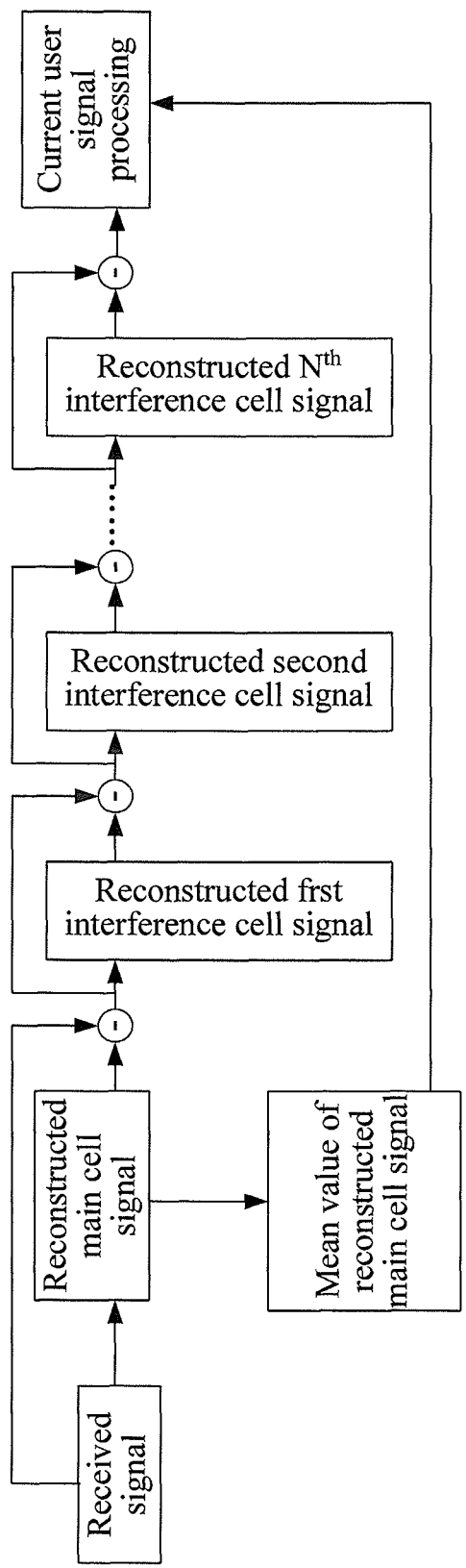
FIG. 6 is a schematic flow chart of the signal processing of an interference elimination method according to Embodiment 4 of the present invention.

FIG. 6 is a schematic flow chart of the signal processing of an interference elimination method in Embodiment 4 of the present invention. As shown in FIG. 6, in the interference elimination method in Embodiment 4, based on the first residual signal, the reconstructed first interference cell signal is obtained, and based on the difference between the first residual signal and the reconstructed first interference cell signal, the reconstructed second interference cell signal is obtained. The rest may be deducted by analogy. The basis on which the $N^{th}$ interference cell signal is reconstructed is the difference value between the first residual signal and the preceding reconstructed N−1 interference cell signals, and after the reconstruction elimination processing on all the N interference cells is completed, a residual signal is obtained by subtracting the reconstructed main cell signal and the reconstructed N interference cell signals from the received signal. When the precision of the reconstructed main cell signal and the reconstructed N interference cell signals is 100%, the residual signal should be 0 in the situation that the residual signal includes no noise. While in the practical application, there may exist a certain error between the reconstructed signal and a real signal, so the residual signal is not 0.

In the received signal, there exists not only inter-cell interference, but also intra-cell interference. To further improve the precision of the interference elimination, a Turbo equalization principle is utilized, a final main cell signal, that is, the current user signal, is obtained by combining the residual signal with the mean value of the reconstructed main cell signal. The mean value of the reconstructed main cell signal may be a chip mean value or a symbol mean value of the reconstructed main cell signal. The chip mean value or the symbol mean value may be obtained by adopting any calculation method of the chip mean value or the symbol mean value in the prior art.

Figure 7:
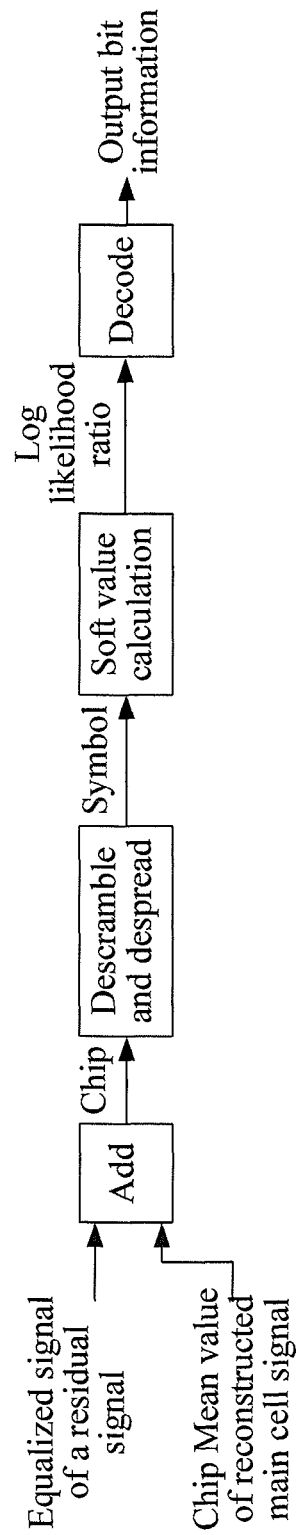
FIG. 7 is a schematic diagram of the current user signal processing of an interference elimination method according to Embodiment 4 of the present invention.
Figure 8:
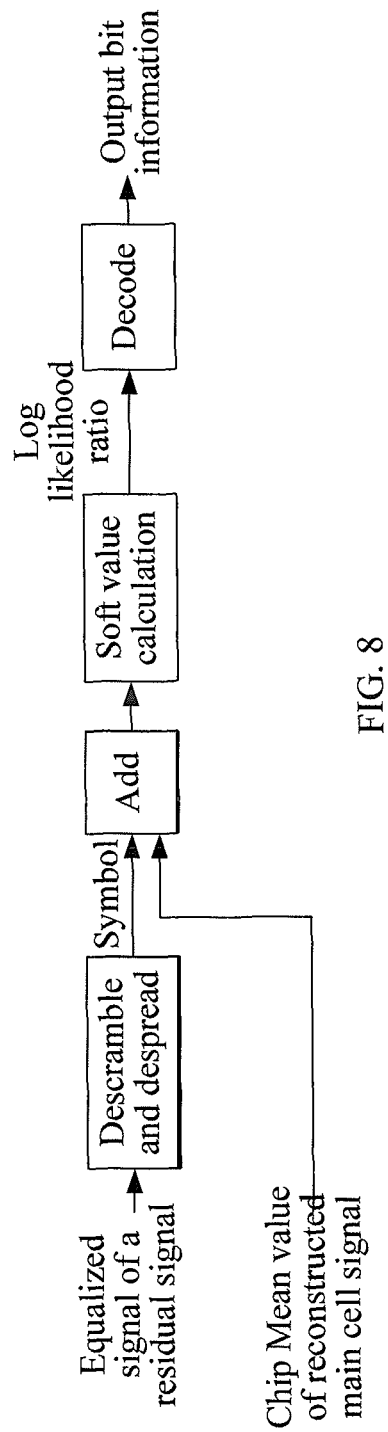
FIG. 8 is another schematic diagram of the current user signal processing of an interference elimination method according to Embodiment 4 of the present invention.

FIG. 7 is a schematic diagram of the current user signal processing of an interference elimination method in Embodiment 4 of the present invention. As shown in FIG. 7, when the chip mean value of the reconstructed main cell signal is adopted, the equalized residual signal is added with the chip mean value of the reconstructed main cell signal, and the processing such as descrambling and despreading, soft value calculation, and decoding is performed on the added signal, so as to obtain final output bit information, that is, the current user signal restored from the received signal. FIG. 8 is another schematic diagram of the current user signal processing of an interference elimination method in Embodiment 4 of the present invention. As shown in FIG. 8, when the symbol mean value of the reconstructed main cell signal is adopted, the descrambling and the despreading are first performed on the equalized residual signal and then the symbol mean value of the reconstructed main cell signal is added with the descrambled and despread residual signal, and the processing such as soft value calculation and decoding is performed on the added symbol, so as to obtain the final output bit information, that is, the current user signal restored from the received signal.

According to the interference elimination method in the foregoing Embodiment 4, the combination of the interference elimination and the Turbo equalization, not only eliminates the inter-cell interference effectively, but also inhibits the intra-cell interference effectively, so as to further improve the precision of the interference elimination, and improve the performance of a receiving end.

Besides, though a serial structure is adopted to perform the signal reconstruction on multiple interference cells in FIG. 6, the serial structure is merely used as an example of this embodiment, but not a limitation. It can be understood by persons skilled in the art that, the adoption of either a parallel structure or a combination of serial and parallel structure to perform the signal reconstruction on multiple interference cells, may implement the interference elimination method in the foregoing Embodiment 4.

The interference elimination method in the foregoing embodiment of the present invention and the linear interference elimination method in the prior art are separately utilized to perform a simulation experiment of interference elimination. In the simulation process, the channel type is PB3, the number of the interference cells is 1, the ratio (SIR) of the power of the main cell signal to the power of the interference cell signal is 0 dB, the ratio (SNR) of the power of the main cell signal to the power of the Gaussian white noise is 20 dB, and the interference cell transmits data only in 8 code channels where the spreading factor (SF) is 16. The simulation result is: when the elimination interference is not performed, the throughput is about 1000 kbps; when the linear interference elimination method in the prior art is adopted, the throughput is about 2500 kbps; when the interference elimination method in Embodiment 1 of the present invention is adopted and the blind reconstruction is adopted, the throughput is about 2750 kbps; when the interference elimination method in Embodiment 1 of the present invention is adopted and the soft reconstruction is adopted, the throughput is about 2900 kbps; and when the interference elimination method in Embodiment 4 of the present invention is adopted and the soft reconstruction is adopted, the throughput is about 3300 kbps. It can be seen that, the effects of interference elimination in the Embodiments 1 and 4 of the present invention are both obviously superior to that of the linear interference elimination method in the prior art. In addition, the effect of interference elimination of adopting the interference elimination method in Embodiment 1 of the present invention and adopting the soft reconstruction is further improved relative to the blind reconstruction; and when both the interference elimination method in Embodiment 4 of the present invention and the soft reconstruction are adopted, the optimum effect of interference elimination may be obtained.

Embodiment 5

Figure 9:
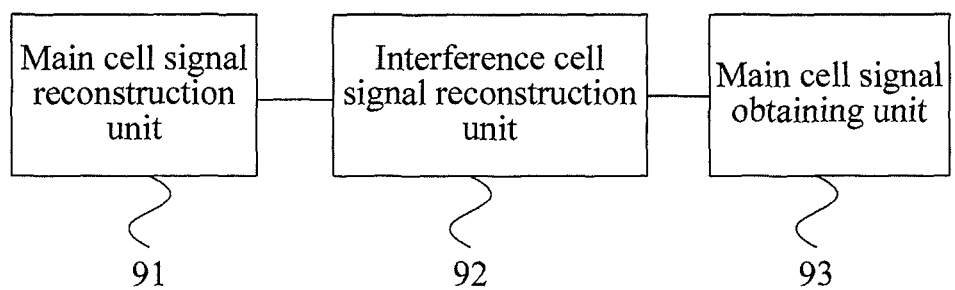
FIG. 9 is a schematic structural diagram of an interference elimination device according to Embodiment 5 of the present invention.

FIG. 9 is a schematic structural diagram of an interference elimination device in Embodiment 5 of the present invention. The device may be used as a unit wholly integrated in a receiver, or as an independent device located outside a receiver and connected with the receiver (in a wired or wireless manner), to perform the interference elimination processing on a signal received by the receiver. As shown in FIG. 9, the interference elimination device includes:

a main cell signal reconstruction unit 91, configured to, according to a received signal, reconstruct a main cell signal, obtain the reconstructed main cell signal, and subtract the reconstructed main cell signal from the received signal, so as to obtain a first residual signal;

an interference cell signal reconstruction unit 92, configured to, according to the first residual signal, reconstruct an interference cell signal, and obtain the reconstructed interference cell signal; and a main cell signal obtaining unit 93, according to the received signal and the reconstructed interference cell signal, obtain an interference-eliminated main cell signal.

The process in which the interference elimination device in the foregoing Embodiment 5 performs the interference elimination on the received signal is the same as that in the interference elimination method in the foregoing embodiments, which is not repeated again herein.

According to the interference elimination device in the foregoing Embodiment 5, because the main cell signal is generally the strongest signal in the received signal, and because the receiver is located in the main cell, and can know more configuration and transmission information of the main cell relative to the interference cell, the reconstruction may be performed well on the main cell signal. Therefore, when the interference cell signal reconstruction is performed based on the first residual signal that is obtained after the reconstructed main cell signal is subtracted from the received signal, the accuracy of the reconstructed interference cell signal is greatly improved relative to the reconstruction performed on the interference cell signal directly according to the received signal, the inter-cell interference is eliminated effectively, and thereby the precision of the finally obtained main cell signal is improved.

Furthermore, the main cell signal reconstruction unit 91 and the interference cell signal reconstruction unit 92 are both configured to:

according to the formula $$w = \sigma_{x\,target}^2 h_{target}^H \left( \sigma_x^2 h h^H + \sum_1^N \sigma_{xi}^2 h_i h_i^H + \sigma_n^2 I \right)^{-1},$$

perform the preprocessing on a to-be-reconstructed target cell signal, in which w is an equalization coefficient of the target cell signal, $\sigma_{x\,target}^2$ is the target cell signal power, $\sigma_x^2$ is the main cell signal power, $\sigma_{x\,i}^2$ is the $i^{th}$ interference cell signal power, $h_{target}$ is an estimated value of a target cell channel, h is an estimated value of a main cell channel, $h_i$ is an estimated value of the $i^{th}$ interference cell channel, N is the number of interference cells, H is a conjugated transpose, I is a unit matrix, and $\sigma_n^2$ is the noise power;

detect a code channel occupied by the target cell signal in the target cell;

perform code channel signal reconstruction processing on each code channel, and obtain a code channel reconstruction sub-signal corresponding to each code channel;

multiply each code channel reconstruction sub-signal by a specified elimination coefficient, and convolve the accumulation sum of each code channel reconstruction sub-signal multiplied by the elimination coefficient with the estimated value $h_{target}$ of the target cell channel, in which the target cell is the main cell or the interference cell which is to be reconstructed.

Furthermore, the main cell signal reconstruction unit 91 and the interference cell signal reconstruction unit 92 are both further configured to:

if modulation manner information of the code channel is known or detected, perform the soft reconstruction on a code channel corresponding to the current user of the main cell after decoding according to the corresponding modulation manner information, and perform the soft reconstruction on a code channel corresponding to other users of the main cell and a code channel of the interference cell before decoding according to the corresponding modulation manner information; and if the modulation manner information of the code channel is unknown and undetected, perform the blind reconstruction on the code channel.

Furthermore, the same elimination coefficient or different elimination coefficients may be set for each code channel of the target cell.

Furthermore, the elimination coefficient is greater than 0 and less than 2.

Embodiment 6

Figure 10:
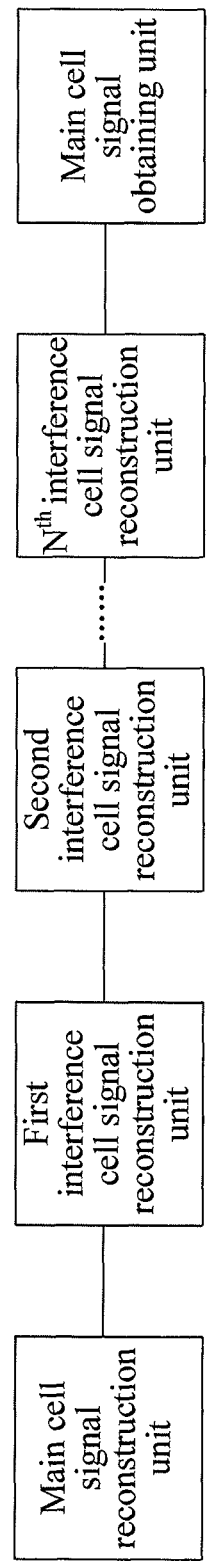
FIG. 10 is a schematic structural diagram of an interference elimination device according to Embodiment 6 of the present invention.

FIG. 10 is a schematic structural diagram of an interference elimination device in Embodiment 6 of the present invention. As shown in FIG. 10, the interference cell signal reconstruction unit includes N interference cell signal reconstruction units respectively corresponding to N interference cells, in which:

a first interference cell signal reconstruction unit is configured to, according to the first residual signal, reconstruct a first interference cell, obtain the reconstructed first interference cell signal, and subtract the reconstructed first interference cell signal from the received signal, so as to obtain a second residual signal; and a second interference cell signal reconstruction unit to an $N^{th}$ interference cell signal reconstruction unit are configured to, according to the second residual signal, perform the serial or parallel reconstruction processing on interference signals of one or more other interference cells except the first interference cell, and if the serial reconstruction processing is performed, arrange the N interference cells in descending order according to a sequence of power of N interference cells, in which the power of the first interference cell is the highest in all the N interference cells, and N is a natural number.

According to the interference elimination device in the foregoing Embodiment 6, when there exists multiple interference cells, because the reconstructed signal of the first interference cell with the strongest power is obtained according to the difference between the received signal and the reconstructed main cell signal, the signal reconstruction is performed on the interference cell with the strongest power with high precision, thereby improving the precision of executing reconstruction of the remaining interference cell signal sequentially based on the difference between the received signal and the reconstructed first interference cell signal, and improving the accuracy of the interference elimination.

Embodiment 7

Figure 11:
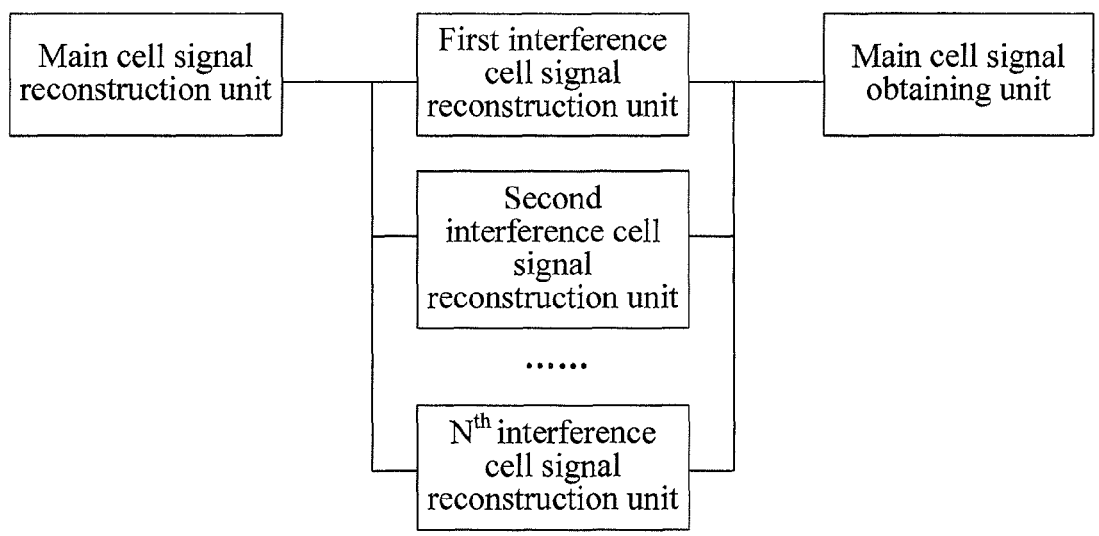
FIG. 11 is a schematic structural diagram of an interference elimination device according to Embodiment 7 of the present invention.

FIG. 11 is a schematic structural diagram of an interference elimination device in Embodiment 7 of the present invention. As shown in FIG. 11, the interference cell signal reconstruction unit includes N interference cell signal reconstruction units respectively corresponding to N interference cells, in which:

a first interference cell signal reconstruction unit to an $N^{th}$ interference cell signal reconstruction unit are configured to, according to a first residual signal parallel, perform parallel reconstruction processing on each interference cell signal, so as to obtain reconstructed each interference cell signal.

According to the interference elimination device in the foregoing Embodiment 7, the combination of the interference elimination and the Turbo equalization, not only eliminates the inter-cell interference effectively, but also inhibits the intra-cell interference effectively, so as to further improve the precision of the interference elimination, and improve the performance of a receiving end.

Embodiment 8

Figure 12:
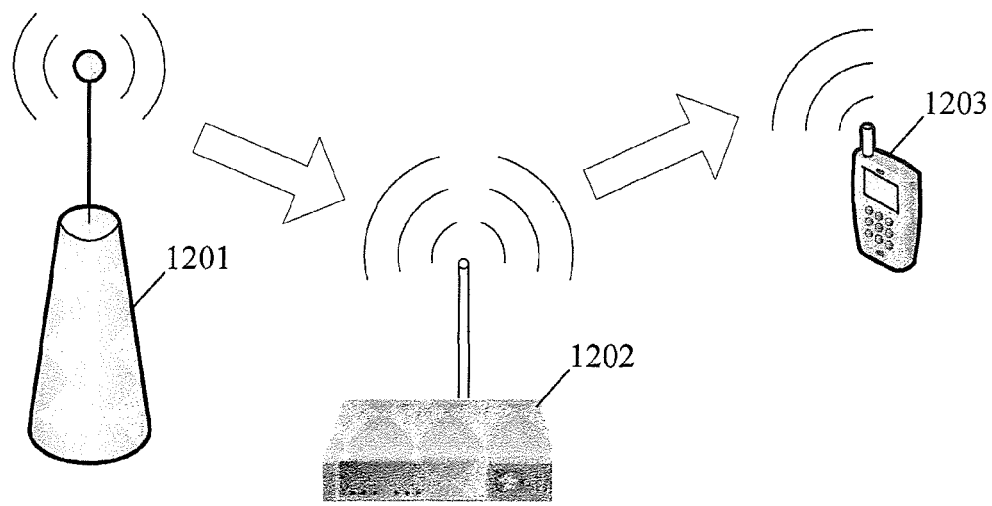
FIG. 12 is a schematic diagram of a system embodiment according to Embodiment 8 of the present invention.

An embodiment of the present invention further provides a communication system, as shown in FIG. 12, the communication system may be applied in a communications field such as WCDMA, LTE or GSM, and the system includes: an interference elimination device 1202, a transmitter 1201 and a receiver 1203, in which, the transmitter and the receiver are located in a same cell, a cell where the transmitter and the receiver are located is a main cell, and an adjacent cell that causes interference to the main cell is an interference cell;

the interference elimination device is configured to, according to a received signal, reconstruct a main cell signal, obtain the reconstructed main cell signal, and subtract the reconstructed main cell signal from the received signal, so as to obtain a first residual signal; according to the first residual signal, reconstruct an interference cell signal, and obtain the reconstructed interference cell signal; and according to the received signal and the reconstructed interference cell signal, obtain an interference-eliminated main cell signal;

the transmitter is configured to transmit a signal to the receiver; and the receiver is configured to receive the signal transmitted by the transmitter.

Furthermore, the interference elimination device includes:

a main cell signal reconstruction unit, configured to, according to a received signal, reconstruct a main cell signal, obtain the reconstructed main cell signal, and subtract the reconstructed main cell signal from the received signal, so as to obtain a first residual signal;

an interference cell signal reconstruction unit, configured to, according to the first residual signal, reconstruct an interference cell signal, and obtain the reconstructed interference cell signal; and a main cell signal obtaining unit, according to the received signal and the reconstructed interference cell signal, obtain an interference-eliminated main cell signal.

It should be noted that, the interference elimination device in the embodiment of the present invention is an independent device located outside the receiver, and the interference elimination device may further be integrated in the receiver.

According to the communication system in the foregoing Embodiment 8, while the signal is received, the effective interference elimination is performed on the received signal.

Through the descriptions in the preceding implementation manners, persons skilled in the art may clearly understand that the embodiments of the present invention may be implemented through software and necessary general hardware, and the general hardware includes a general integrated circuit, a general CPU, a general memory, and a general component. Definitely, the embodiments of the present invention may also be implemented through dedicated hardware, including a dedicated integrated circuit, a dedicated CPU, a dedicated memory, a dedicated component, and so on, but the former is the preferred implementation manner in many cases. Based on this, the technical solutions of the present invention or the part that makes contributions to the prior art can be substantially embodied in the form of a software product. The computer software product may be stored in a readable storage medium, for example, a floppy disk, hard disk, or optical disk of the computer, and contain several instructions used to instruct a computer device (for example, a personal computer, a server, or a network device) to perform the method according to the embodiments of the present invention.

The sequence of the steps in the method embodiments can be adjusted according to the requirements in actual applications, and the steps can be combined into new solutions according to the requirements in the actual applications. The units and modules in the foregoing apparatus embodiments can be divided or recombined according to the requirements in the actual applications.

Finally, it should be noted that the above embodiments are merely intended for describing the technical solutions of the present invention except limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the spirit and scope of the technical solutions of the embodiments of the present invention.

What is claimed is:

1. An interference elimination method, comprising:
according to a received signal, reconstructing a main cell signal, obtaining the reconstructed main cell signal, and subtracting the reconstructed main cell signal from the received signal, so as to obtain a first residual signal;
according to the first residual signal, reconstructing an interference cell signal and obtaining the reconstructed interference cell signal; and
obtaining an interference-eliminated main cell signal according to the received signal and the reconstructed interference cell signal.

2. The interference elimination method according to claim 1, wherein the performing the reconstructing the interference cell signal according to the first residual signal, comprises:
according to the first residual signal, reconstructing a first interference cell signal, obtaining the reconstructed first interference cell signal, and subtracting the reconstructed first interference cell signal from the received signal, so as to obtain a second residual signal, and according to the second residual signal, performing serial or parallel reconstruction processing on interference signals of one or more other interference cells except a first interference cell, and if the serial reconstruction processing is performed, arranging the N interference cells in descending order according to a sequence of power of N interference cells, wherein power of the first interference cell is the highest in all the N interference cells of a main cell, and N is a natural number.

3. The interference elimination method according to claim 1, wherein the performing the reconstructing the interference cell signal according to the first residual signal, comprises:
according to the first residual signal, performing parallel reconstruction processing on each interference cell signal, so as to obtain each reconstructed interference cell signal.

4. The interference elimination method according to claim 1, wherein the performing the reconstructing the main cell signal, comprises:
according to a formula $$w = \sigma_{x\ target}^2 h_{target}^H \left( \sigma_x^2 h h^H + \sum_{1}^{N} \sigma_{xi}^2 h_i h_i^H + \sigma_n^2 I \right)^{-1},$$

performing preprocessing on a to-be-reconstructed target cell signal, wherein w is an equalization coefficient of the target cell signal, $\sigma_{x\ target}^2$ is target cell signal power, $\sigma_x^2$ is main cell signal power, $\sigma_{x\ i}^2$ is $i^{th}$ interference cell signal power, $h_{target}$ is an estimated value of a target cell channel, h is an estimated value of a main cell channel, $h_i$ is an estimated value of an $i^{th}$ interference cell channel, N is the number of interference cells, H is a conjugated transpose, I is a unit matrix, and $\sigma_n^2$ is noise power;

detecting a code channel occupied by the target cell signal in a target cell;

performing code channel signal reconstruction processing on each code channel, and obtaining a code channel reconstruction sub-signal corresponding to each code channel; and multiplying each code channel reconstruction sub-signal by a specified elimination coefficient, and convolving an accumulation sum of each code channel reconstruction sub-signal multiplied by the elimination coefficient with the estimated value $h_{target}$ of the target cell channel, wherein:

the target cell is the main cell which is to be reconstructed.

5. The interference elimination method according to claim 1, wherein the performing the reconstructing the interference cell signal, comprises:

according to a formula $$w = \sigma_{x\,target}^2 h_{target}^H \left( \sigma_x^2 hh^H + \sum_1^N \sigma_{xi}^2 h_i h_i^H + \sigma_n^2 I \right)^{-1},$$

performing preprocessing on a to-be-reconstructed target cell signal, wherein w is an equalization coefficient of the target cell signal, $\sigma_{x\,target}^2$ is target cell signal power, $\sigma_x^2$ is main cell signal power, $\sigma_{x\,i}^2$ is $i^{th}$ interference cell signal power, $h_{target}$ is an estimated value of a target cell channel, h is an estimated value of a main cell channel, $h_i$ is an estimated value of an $i^{th}$ interference cell channel, N is the number of interference cells, H is a conjugated transpose, I is a unit matrix, and $\sigma_n^2$ is noise power;

detecting a code channel occupied by the target cell signal in a target cell;

performing code channel signal reconstruction processing on each code channel, and obtaining a code channel reconstruction sub-signal corresponding to each code channel;

multiplying each code channel reconstruction sub-signal by a specified elimination coefficient, and convolving an accumulation sum of each code channel reconstruction sub-signal multiplied by the elimination coefficient with the estimated value $h_{target}$ of the target cell channel, wherein:

the target cell is an interference cell which is to be reconstructed.

6. The interference elimination method according to claim 4, wherein the performing the code channel signal reconstruction processing on each code channel, comprises:

if modulation manner information of the code channel is known or detected, performing soft reconstruction on a code channel corresponding to a current user of the main cell after decoding according to the corresponding modulation manner information, and performing soft reconstruction on a code channel corresponding to other users of the main cell and a code channel of an interference cell before decoding according to the corresponding modulation manner information; and if the modulation manner information of the code channel is unknown and undetected, performing blind reconstruction on the code channel.

7. The interference elimination method according to claim 4, wherein a same elimination coefficient or different elimination coefficients is set for each code channel of the target cell.

8. The interference elimination method according to claim 7, wherein the elimination coefficient is greater than 0 and less than 2.

9. The interference elimination method according to claim 1, wherein the obtaining the interference-eliminated main cell signal according to the received signal and the reconstructed interference cell signal, comprises:

calculating a mean value of the reconstructed main cell signal;

subtracting the reconstructed main cell signal and the reconstructed interference cell signal from the received signal, and obtaining a residual signal; and according to the residual signal, performing equalization and adding the equalized residual signal with the mean value, and obtaining the interference-eliminated main cell signal.

10. An interference elimination device, comprising:

a main cell signal reconstruction unit, configured to, according to a received signal, reconstruct a main cell signal, obtain the reconstructed main cell signal, and subtract the reconstructed main cell signal from the received signal, so as to obtain a first residual signal;

an interference cell signal reconstruction unit, configured to, according to the first residual signal, reconstruct an interference cell signal, and obtain the reconstructed interference cell signal; and a main cell signal obtaining unit, according to the received signal and the reconstructed interference cell signal, obtain an interference-eliminated main cell signal.

11. The interference elimination device according to claim 10, wherein the interference cell signal reconstruction unit comprises N interference cell signal reconstruction units corresponding to N interference cells, wherein:

a first interference cell signal reconstruction unit is configured to, according to the first residual signal, reconstruct a first interference cell, obtain the reconstructed first interference cell signal, and subtract the reconstructed first interference cell signal from the received signal, so as to obtain a second residual signal; and a second interference cell signal reconstruction unit to an $N^{th}$ interference cell signal reconstruction unit are configured to, according to the second residual signal, perform serial or parallel reconstruction processing on interference signals of one or more other interference cells except a first interference cell, and if the serial reconstruction processing is performed, arrange the N interference cells in descending order according to a sequence of power of N interference cells, wherein power of the first interference cell is the highest in all the N interference cells of a main cell, and N is a natural number.

12. The interference elimination device according to claim 10, wherein the interference cell signal reconstruction unit comprises N interference cell signal reconstruction units corresponding to N interference cells, wherein:

a first interference cell signal reconstruction unit to an $N^{th}$ interference cell signal reconstruction unit are configured to, according to the first residual signal, perform parallel reconstruction processing on each interference cell signal, so as to obtain each reconstructed interference cell signal.

13. The interference elimination device according to claim 10, wherein the main cell signal reconstruction unit is configured to:
according to a formula perform $$w = \sigma_{x\,target}^2 h_{target}^H \left( \sigma_x^2 hh^H + \sum_{1}^{N} \sigma_{xi}^2 h_i h_i^H + \sigma_n^2 I \right)^{-1},$$

preprocessing on a to-be-reconstructed target cell signal, wherein w is an equalization coefficient of the target cell signal, $\sigma_{x\,target}^2$ is target cell signal power, $\sigma_x^2$ is main cell signal power, $\sigma_{x\,i}^2$ is $i^{th}$ interference cell signal power, $h_{target}$ is an estimated value of a target cell channel, h is an estimated value of a main cell channel, $h_i$ is an estimated value of an $i^{th}$ interference cell channel, the N is the number of interference cells, H is a conjugated transpose, I is a unit matrix, and $\sigma_n^2$ is noise power;
detect a code channel occupied by the target cell signal in a target cell;
perform code channel signal reconstruction processing on each code channel, and obtain a code channel reconstruction sub-signal corresponding to each code channel;
multiply each code channel reconstruction sub-signal by a specified elimination coefficient, and convolve an accumulation sum of each code channel reconstruction sub-signal multiplied by the elimination coefficient with the estimated value $h_{target}$ of the target cell channel, wherein:
the target cell is the main cell which is to be reconstructed.

14. The interference elimination device according to claim 10, wherein the interference cell signal reconstruction unit is configured to:
according to a formula perform $$w = \sigma_{x\,target}^2 h_{target}^H \left( \sigma_x^2 hh^H + \sum_{1}^{N} \sigma_{xi}^2 h_i h_i^H + \sigma_n^2 I \right)^{-1},$$

preprocessing on a to-be-reconstructed target cell signal, wherein w is an equalization coefficient of the target cell signal, $\sigma_{x\,target}^2$ is target cell signal power, $\sigma_x^2$ is main cell signal power, $\sigma_{x\,i}^2$ is $i^{th}$ interference cell signal power, $h_{target}$ is an estimated value of a target cell channel, h is an estimated value of a main cell channel, $h_i$ is an estimated value of an $i^{th}$ interference cell channel, N is the number of interference cells, H is a conjugated transpose, I is a unit matrix, and $\sigma_n^2$ is noise power;
detect a code channel occupied by the target cell signal in a target cell;
perform code channel signal reconstruction processing on each code channel, and obtain a code channel reconstruction sub-signal corresponding to each code channel;
multiply each code channel reconstruction sub-signal by a specified elimination coefficient, and convolve an accumulation sum of each code channel reconstruction sub-signal multiplied by the elimination coefficient with the estimated value $h_{target}$ of the target cell channel, wherein:
the target cell is an interference cell which is to be reconstructed.

15. The interference elimination device according to claim 13, wherein the main cell signal reconstruction unit is further configured to:
if modulation manner information of the code channel is known or detected, perform soft reconstruction on a code channel corresponding to a current user of the main cell after decoding the code channel according to the corresponding modulation manner information, and perform soft reconstruction on a code channel corresponding to other users of the main cell and a code channel of the interference cell before decoding according to the corresponding modulation manner information; and
if the modulation manner information of the code channel is unknown and undetected, perform blind reconstruction on the code channel.

16. The interference elimination device according to claim 14, wherein the interference cell signal reconstruction unit is further configured to:
if modulation manner information of the code channel is known or detected, perform soft reconstruction on a code channel corresponding to a current user of the main cell after decoding according to the corresponding modulation manner information, and perform soft reconstruction on a code channel corresponding to other users of the main cell and a code channel of the interference cell before decoding according to the corresponding modulation manner information; and
if the modulation manner information of the code channel is unknown and undetected, perform blind reconstruction on the code channel.

17. The interference elimination device according to claim 13, wherein a same elimination coefficient or different elimination coefficients is capable of being set for each code channel of the target cell.

18. The interference elimination device according to claim 17, wherein the elimination coefficient is greater than 0 and less than 2.

19. The interference elimination device according to claim 10, wherein the main cell signal reconstruction unit is further configured to calculate a mean value of the reconstructed main cell signal; and
accordingly, the main cell signal obtaining unit comprises:
a first processing unit, configured to subtract the reconstructed main cell signal and the reconstructed interference cell signal from the received signal, and obtain a residual signal; and
a second processing unit, configured to, according to the residual signal, perform equalization and add the equalized residual signal with the mean value, and obtain the interference-eliminated main cell signal.

20. A communication system, comprising: an interference elimination device, a transmitter and a receiver, wherein the transmitter and the receiver are located in a same cell, the cell where the transmitter and the receiver are located is a main cell, an adjacent cell that causes interference to the main cell is an interference cell;
the interference elimination device is configured to, according to a received signal, reconstruct a main cell signal, obtain the reconstructed main cell signal, and subtract the reconstructed main cell signal from the received signal, so as to obtain a first residual signal; according to the first residual signal, reconstruct an interference cell signal, and obtain the reconstructed interference cell signal; and according to the received signal and the reconstructed interference cell signal, obtain an interference-eliminated main cell signal;

the transmitter is configured to transmit a signal to the receiver; and the receiver is configured to receive the signal transmitted by the transmitter.

21. The communication system according to claim 20, wherein the interference elimination device comprises:

a main cell signal reconstruction unit, configured to, according to the received signal, perform the reconstructing the main cell signal, obtain the reconstructed main cell signal, and subtract the reconstructed main cell signal from the received signal, so as to obtain the first residual signal;

an interference cell signal reconstruction unit, configured to, according to the first residual signal, perform the reconstructing the interference cell signal, and obtain the reconstructed interference cell signal; and a main cell signal obtaining unit, according to the received signal and the reconstructed interference cell signal, obtain the interference-eliminated main cell signal.

\* \* \* \* \*